United States Patent

[11] 3,626,195

| [72] | Inventors | Antony Brian Fitzjohn;<br>Ian Thompson; Anthony Wilson, all of<br>Sheffield, England |
|---|---|---|
| [21] | Appl. No. | 54,740 |
| [22] | Filed | July 14, 1970 |
| [45] | Patented | Dec. 7, 1971 |
| [73] | Assignee | British Steel Corporation<br>London, England |
| [32] | Priority | July 23, 1969 |
| [33] | | Great Britain |
| [31] | | 37,018/69 |

[54] RADIATION SENSITIVE APPARATUS FOR MEASURING WORKPIECES
11 Claims, 3 Drawing Figs.

[52] U.S. Cl. .................................................. 250/219 S,
250/233, 356/160
[51] Int. Cl. .................................................. G01b 7/12
[50] Field of Search .................................................. 250/219 S,
233, 231; 356/159, 160, 168

[56] References Cited
UNITED STATES PATENTS

| 3,000,255 | 9/1961 | Iddings .......................... | 250/233 X |
| 3,017,801 | 1/1962 | Ingber .......................... | 356/159 X |
| 3,264,559 | 8/1966 | Eppler .......................... | 250/219 S X |
| 3,495,452 | 2/1970 | Johnson, Jr. et al. ......... | 250/231 X |
| 3,526,448 | 9/1970 | Senseney ...................... | 250/233 X |

Primary Examiner—Walter Stolwein
Attorney—Bacon and Thomas

ABSTRACT: Apparatus for measuring a diameter of a workpiece comprises two sensors each of which has a wheel and a pulse generator controlled by the wheel. The wheel on one sensor makes contact with a portion of the workpiece the diameter of which is to be measured and the wheel on the other sensor makes contact with a reference body of known diameter rotatable in synchronism with the workpiece, e.g. a chuck or faceplate. Counter circuitry is provided which is responsive to the outputs from the pulse generators and is operative to determine the ratio of these outputs whereby, knowing the diameter of the reference body, the diameter of the workpiece can be derived therefrom.

RADIATION SENSITIVE APPARATUS FOR MEASURING WORKPIECES

This invention relates to workpiece measuring apparatus and more particularly relates to such apparatus for measuring a diameter of the workpiece in a lathe, grinding machine, boring mill or like machine tool whilst the workpiece or tool is rotating, or it could be used for measuring the diameter of a workpiece whilst it is on an inspection or marking out table. The apparatus may also be used for measuring the peripheral speed of the workpiece.

Existing apparatus for measuring workpiece diameter whilst work is in progress primarily falls into two categories, namely, those mounted on the machine and measuring the position of the cutting tool, and those measuring the circumference to the workpiece by a nonslip drive off the workpiece over one or more complete revolutions. Both have disadvantages apart from the common one of high cost, the former being dependent upon the accuracy, rigidity, freedom from wear and excessive clearances in the machine and tool holder, whilst the latter is dependent, inter alia, on reliable means for generating a signal at intervals of precisely one revolution.

It is an object of this invention to provide an improved workpiece measuring apparatus.

According to the present invention there is provided apparatus for measuring a diameter of a workpiece comprising two sensors each having a rotatable wheel and a pulse generator controlled by said wheel, the wheel on one of the sensors being adapted to make frictional driving contact with a portion of the workpiece, the diameter of which is to be measured, and the wheel of the other sensor being adapted to make frictional driving contact with a reference body of known diameter rotatable in synchronism with the workpiece, and means for determining the ratio of the pulse outputs from the two generators and to derive therefrom the diameter of said workpiece.

The reference body may constitute a part of the workpiece itself, but more conveniently it may comprise a chuck or faceplate, etc.

The said one sensor may conveniently move with, e.g. the tool holder, and more particularly, its wheel may bear on the workpiece on a surface which has just been cut at a position where it is not subject to falling or flying chips of metal which may, by passing between the wheel and the workpiece, affect the accuracy.

The means for determining the ratio of the pulse outputs from the two pulse generators may comprise a first counter with a visible display responsive to the said one sensor and a second counter responsive to the other sensor, adapted to count to any predetermined number, the two counters being interconnected so that when the predetermined number is reached on the second counter the count then subsisting on the first counter is transferred to the visible display. Both counters are preferably adapted to reset and restart when the count is transferred, the display being continuously up-dated as the second counter sequentially reaches the predetermined number.

The display is preferably arranged to indicate directly the diameter of the workpiece in any chosen units.

The pulse generators in the two sensing heads may be any one of a variety of types, e.g. optical, electromagnetic, mechanical, etc., but an optical system is favored because of the low torque required to effect the drive and hence reduce the possibility of slipping occurring between the wheel and the workpiece/reference.

Wear is also minimized because of the low contact pressure required.

The optical system employed may comprise two annular discs parallel spaced from one another and each having a radial pattern of, say, 100 equally or substantially equally spaced lines to give equal black and white areas. One disc is fixed whilst the other rotates with the wheel, so that, with the discs interposed between a light emitter and a photocell the latter responds to a pulsating light signal. By arranging for the irradiated field to extend over a fair proportion of the area of the annular discs the photocell responds to a much greater light intensity than would be the case if the fixed disc only had a single slit cooperating with the other patterned disc. Furthermore, the patterns need not be produced with such extreme accuracy, and any foreign matter which might happen to be collected by either disc will not greatly influence the response.

As mentioned above, this apparatus may also be used for indicating the mean peripheral speed of the workpiece and in this regard a standard time base or clock pulse generator may be utilized for periodically reading out the content of the first counter, this count being indicated directly by the display in units of linear or angular velocity.

Apparatus in accordance with this invention offers many advantages over measuring apparatus employed hitherto. For example, this apparatus does not rely on accurately machined follower wheels and can be easily calibrated by the operator, it being readily suitable to indicate in Imperial, Metric or any other units of measurement. Further, the accuracy of reading and the speed of readout can readily be changed to suit the type of work being machined and the design of the sensors is such that it can be made very small, thus contributing to the ease of application and to the cost of the equipment and its installation. In addition, as mentioned, the peripheral speed of the workpiece may also be displayed.

In order that the invention may be fully understood one embodiment thereof will now be described with reference to the accompanying drawings in which:

FIG. 3 illustrates part of the optical discs employed in the sensing head.

Figure 1:
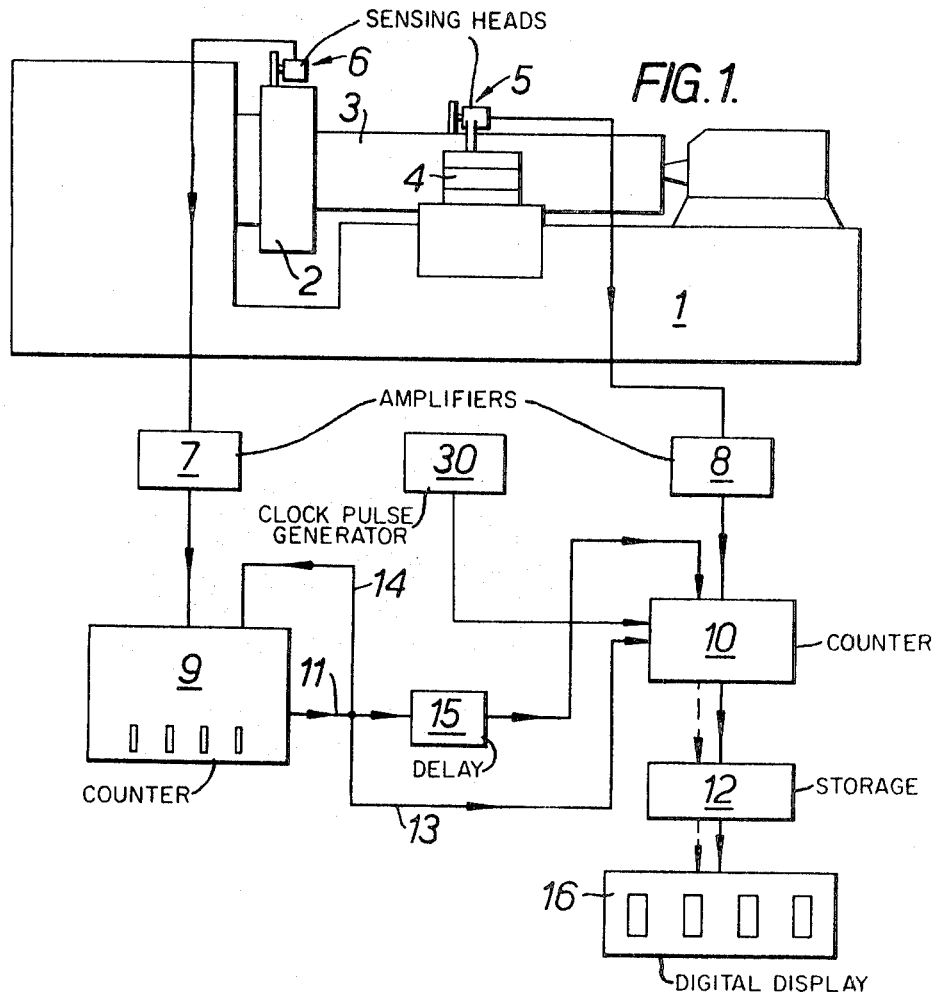
FIG. 1 illustrates the apparatus in block diagram form.

Referring now to FIG. 1 there is shown a lathe 1 having a chuck 2 in which is gripped a workpiece 3. A tool holder 4 has mounted on it a sensing head 5 and, on the opposite side of the workpiece, a turning tool (not shown).

The sensing head is urged into contact with the workpiece by, e.g. a spring, and a similar sensing head 6 is urged into contact with the surface of the chuck.

Mounted in the sensing heads are pulse generators —which are later described in detail—and the outputs from them are fed through amplifiers 7, 8 to counters 9, 10. More particularly, the counter 9 is preset to a particular value and receives its input from the sensing head 6, an output being developed from it on lead 11 at the instant the received count equals the set count. The counter 10 receives its input from the sensing head 5 and its counts is transferred to a storage unit 12 in response to the output from the preset counter 9 on lead 13. This output also resets and restarts the counter 9 itself via lead 14 and resets and restarts the counter 10 after a short delay occasioned by a delay circuit 15.

The content of the storage unit 12 is indicated on a digital display unit 16, the storage unit enabling the display to be retained until it is up-dated at the end of the next count.

Figure 2:
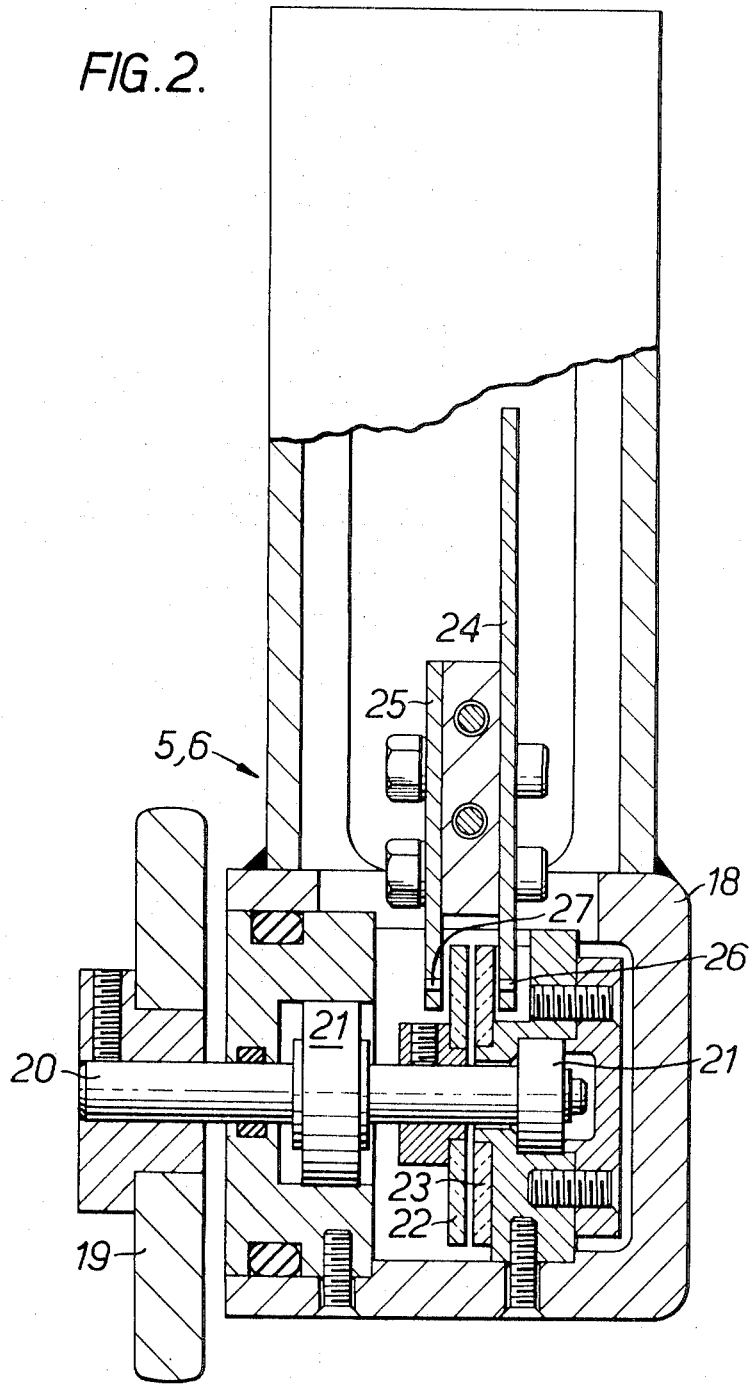
FIG. 2 is a sectional view through one of the sensing heads.

Referring now to FIG. 2, the sensing head comprises a housing 18 carrying at one side a wheel 19. This wheel may be tipped with tungsten carbide and is supported on a shaft 20 running on bearings 21 and carries at its inner end an annular disc 22 made from, e.g. glass or perspex. A similar disc 23 is secured to a fixed part of the housing.

These two discs lie between printed circuit boards 24, 25 which carry a light source 26, e.g. a gallium arsenide emitter, and a photocell 27, respectively, as well as carrying an amplifier to improve the signal strength before it is transmitted further.

The construction of these discs is shown in more detail in FIG. 3. In particular, each disc is divided up into a radial pattern of, say, 100 lines to give equal black areas 28 and white areas 29, this pattern being produced by photoetching techniques.

Thus, as the wheel 19 rotates, it carries with it the disc 22 so that the photocell 27 responds to pulsating light signals as the line patterns on the two discs are alternatively aligned and misaligned with one another.

Considering now the operation of the apparatus, the theory on which the measurement is based will first be discussed.

Assuming that the diameters of the chuck (the reference body) and the workpiece $D_r$ and $D_w$ respectively, the diameters of the driving wheels on the sensing heads are $d_r$ and $d_w$ respectively, and the numbers of pulses from the pulse generators per revolution of their respective driving wheels are $N_r$ and $n_w$ respectively, then the total number of pulses ($P_r$ and $P_w$ respectively) from the generators in n revolutions of the workpiece are given by:

$$P_r = n \times D_r \times N_r / d_r$$
and $P_w = n \times D_w \times N_w / d_w$ By definition, the latter figure is to be representative of the diameter of the workpiece, and if this is required to any accuracy of $\pm 1/X$ (where X is, say, 1,000 or 100 etc.) the diameter of the workpiece must be multiplied by the factor X.

Therefore, $n \times D_w \times N_w / d_w = D_w \times X$ or $n = X \times d_w / N_w$ and the particular value to be preset in the counter 9 can be calculated by substituting this figure in the equation for $P_r$:

$P_r = X \times d_w \times D_r \times N_r / (N_w \times d_r)$ (2) If, in the simplest arrangement, $N_w = N_r$ and $d_w = d_r$ then:

$P_r = X \times D_r$

Thus, subject only to adjusting the decimal point in accordance with the degree of accuracy required, the apparatus is suitable for Imperial, Metric or any other system of measurement without any change of the mechanical parts, it only being necessary to known the diameter of the chuck in the required units and to the required degree of accuracy.

If $N_w$ does not equal $N_r$ and/or $d_w$ does not equal $d_r$ than a figure for $P_r$ can be calculated from the fuller equation, or more easily both pulse generators can be driven off the chuck and the figure obtained by trial and error by adjusting the setting of the counter 9 until the display unit 16 indicates the chuck diameter.

In operation then, the counter 9 is first set for the required degree of accuracy, Thus, with $N_r$ and $N_w = 100$, as described, and with say, $D_r = 20$, $d_r$ and $d_w = 2$ and an accuracy required to say, 0.01 (X =100) the number $P_r$ to be preset on the counter 9 will, from the above equation (2), be 2000.

With turning in progress pulses are fed from the sensing heads onto the two counters 9 and 10 and, as explained, when the set count 9 has been attained the number when indicated in the counter 10 is transferred into the storage unit 12 and indicated on the display unit 16. At the same time, both counters are reset and restarted and the process is repeated.

The frequency with which the reading will be updated in terms of n, the number of revolutions (equation (1)) is, on the above FIGS., 2. For reduced accuracy, i.e. 0.1 inch, the present number is switched to 200 and the interval between readings is then equivalent to 0.2 revolutions.

In order to achieve a greater degree of accuracy within the time intervals referred to $N_r$ and $N_w$—determined by the lines on the two discs 22, 23 —can be increased to, say, 1000. Alternatively, or additionally, the diameters of the wheels 19 can be reduced.

As mentioned above, provision may also be made for measuring the mean peripheral speed of the workpiece although it is not envisaged that a high degree of accuracy will be required here. In this regard, a standard time base or clock pulse generator 30 is employed to read out the content of the counter 10 at preset intervals. Since the value $P_w$ over any period is proportional to the distance scanned over the peripheral surface then by selecting the time base period the surface speed can readily be determined. In practice, of course, a separate storage unit 12 and a separate display unit 16 would be employed for this "parallel" path with the diameter measurement.

Although the invention has been described with reference to the particular embodiment illustrated it is to be understood that various modifications and alterations may readily be effected without departing from the scope of the invention. For example, other circuit configurations for the read out and display could be adopted and other forms of optical disc could be designed; in addition, the rotatable disc could be driven through gearing instead of by direct drive. As a further measure is this regard a gear chain or a belt drive may be introduced between the wheel and the "grating" discs so as to enable the apparatus to measure the diameter of grooves which are too narrow for the sensing heads to enter.

Furthermore, the invention is equally applicable to grinding and boring operations as to the turning operations illustrated. In particular, in a horizontal boring machine—in which the workpiece is stationary and the tool holder rotates—the pulse generator to be driven by the workpiece will be mounted on the tool holder, with its driving wheel urged into contact with the bore in the workpiece, the power to, and the signal from the pulse generator being transmitted through slip rings or some other rotary link.

In addition, as mentioned above, the invention is also applicable to the measurement of the diameter of a workpiece while this is on an inspection or marking-out table, a reference body of known diameter being provided as before.

We claim:

1. Apparatus for measuring a diameter of a workpiece comprising two sensors, each sensor having
a rotatable wheel, and
a pulse generator controlled by said wheel, the wheel on one of the sensors being adapted to make frictional driving contact with a portion of the workpiece the diameter of which is to be measured, and wheel of the other sensor being adapted to make frictional driving contact with a reference body of known diameter rotatable in synchronism with the workpiece, and
means for determining the ratio of the pulse outputs from the two generators and to derive therefrom the diameter of the said workpiece.

2. Apparatus according to claim 1, wherein the ratio-determining means comprises a first counter responsive to the one sensor,
a second counter responsive to the other sensor and adapted to count to any predetermined number, and
means interconnecting the two counters so that when the second counter reaches the predetermined number the count then subsisting in the first counter is read out.

3. Apparatus according to claim 2, comprising a visible display unit associated with the first counter, the count being read out from the first counter into this display unit which is calibrated to indicate the workpiece diameter.

4. Apparatus according to claim 3, comprising interconnecting means whereby the second counter is operative to reset and restart both itself and the first counter in response to the predetermined number being attained, the display unit being continuously up-dated as the second counter sequentially reaches the predetermined number.

5. Apparatus for measuring a diameter of a workpiece comprising two sensors, each sensor having
a rotatable wheel and
a pulse generator controlled by said wheel, said pulse generator comprising
optical means in which a light path is periodically interrupted in dependence on the wheel rotation, the wheel on one of the sensors being adapted to make frictional driving contact with a portion of the workpiece the diameter of which is to be measured, and the wheel of the other sensor being adapted to make frictional driving contact with a reference body of known diameter rotatable in synchronism with the workpiece, and
means for determining the ratio of the pulse outputs from the two generators and to derive therefrom the diameter of the said workpiece.

6. Apparatus according to claim 5, wherein the optical means comprises
two transparent discs each having a radial pattern of opaque lines on it,
a light source and
a photocell, the two discs being located between the light source and photocell with one of the discs being fixed while the other is movable with the wheel.

7. Apparatus according to claim 6, wherein he ratio-determining means comprises
a first counter responsive to the one sensor,
a display unit connected to the first counter,
a second counter responsive to the other sensor and adapted to count any predetermined number,
first means interconnecting the counter operative so that, when the second counter reaches the predetermined number, the count then subsisting in the first counter is read out into the display unit, and
second means interconnecting the counters whereby the second counter is operative to reset and restart both itself and the first counter in response to the predetermined number being attained, the display unit being continuously up-dated as the second counter sequentially reaches the predetermined number.

8. Apparatus according to claim 7, comprising
means for reading out the pulses from the first counter at predetermined periods whereby to determine therefrom the mean peripheral speed of the workpiece surface.

9. Apparatus according to claim 8, comprising
a gear chain or a belt drive through which the wheel on the or each sensor is coupled to its associate pulse generator.

10. Apparatus according to claim 7, wherein the reference body comprises
a chuck or faceplate in which the workpiece is gripped.

11. Apparatus according to claim 10, comprising
a tool holder for machining the workpiece, the said one sensor being clamped to and movable with this tool holder.

* * * * *